(12) United States Patent
Kim et al.

(10) Patent No.: US 12,423,644 B2
(45) Date of Patent: Sep. 23, 2025

(54) METHOD, SYSTEM, AND NON-TRANSITORY COMPUTER-READABLE RECORDING MEDIUM FOR SUPPORTING TRANSPORTATION OF GOODS

(71) Applicant: DELIVUS, INC., Seoul (KR)

(72) Inventors: Yong Jae Kim, Seoul (KR); Jin Wook Baek, Seoul (KR)

(73) Assignee: DELIVUS, INC., Seoul (KR)

( * ) Notice: Subject to any disclaimer, the term of this patent is extended or adjusted under 35 U.S.C. 154(b) by 0 days.

(21) Appl. No.: 18/694,647

(22) PCT Filed: Sep. 14, 2022

(86) PCT No.: PCT/KR2022/013683
§ 371 (c)(1),
(2) Date: Apr. 22, 2024

(87) PCT Pub. No.: WO2023/048429
PCT Pub. Date: Mar. 30, 2023

(65) Prior Publication Data
US 2024/0394647 A1 Nov. 28, 2024

(30) Foreign Application Priority Data
Sep. 24, 2021 (KR) .......................... 10-2021-0126214

(51) Int. Cl.
*G06Q 10/0834* (2023.01)
*G06Q 10/083* (2024.01)
(Continued)

(52) U.S. Cl.
CPC . *G06Q 10/08345* (2013.01); *G06Q 10/08355* (2013.01); *G06Q 10/0838* (2013.01); *G06Q 30/0206* (2013.01)

(58) Field of Classification Search
CPC ....... G06Q 10/08345; G06Q 10/08355; G06Q 10/0838; G06Q 30/0206
See application file for complete search history.

(56) References Cited

U.S. PATENT DOCUMENTS

2019/0333130 A1* 10/2019 Jha .......................... H04L 67/52
2021/0103892 A1* 4/2021 Han ...................... G05D 1/0291

FOREIGN PATENT DOCUMENTS

JP          H09311702 A       12/1997
JP          2004164434 A       6/2004
(Continued)

OTHER PUBLICATIONS

Yiwen Sun, CoDriver ETA: Combine Driver Information in Estimated Time of Arrival by Driving Style Learning Auxiliary Task, 2022, p. 4037-4039 (Year: 2022).*

(Continued)

*Primary Examiner* — Ibrahim N El-Bathy
(74) *Attorney, Agent, or Firm* — Dinsmore & Shohl LLP; Yongsok Choi, Esq.

(57) ABSTRACT

According to one aspect of the present invention, provided is a method for supporting transportation of goods. The method includes the steps of: acquiring at least one of information on a delivery place or collection place and a quantity of goods to be transported, and information on an amount of time required for transportation of the goods; and determining at least one optimal regional unit where last-mile delivery of the goods is to be performed, on the basis of the acquired information.

11 Claims, 2 Drawing Sheets

(51) Int. Cl.
   *G06Q 10/0835*  (2023.01)
   *G06Q 30/0201*  (2023.01)

(56) References Cited

FOREIGN PATENT DOCUMENTS

| | | | |
|---|---|---|---|
| JP | 2018073213 A | 5/2018 |
| KR | 101411205 B1 | 6/2014 |
| KR | 1020170087621 A | 7/2017 |
| KR | 101972376 B1 | 4/2019 |
| KR | 1020190117979 A | 10/2019 |
| KR | 102023090 B1 | 11/2019 |
| WO | 2020170081 A1 | 8/2020 |

OTHER PUBLICATIONS

Can you specify a delivery person for Demae-kan Explaining the system by which delivery people are assigned [Todomeshi] Food delivery specialized media, [online], Food delivery specialized media Todomeshi Editorial Department, Sep. 18, 2021 [Retrieved Nov. 29, 2024].

What is the expected delivery fee, [online], UberTechnologies, Aug. 2, 2021 [Retrieved Nov. 29, 2024].

\* cited by examiner

METHOD, SYSTEM, AND NON-TRANSITORY COMPUTER-READABLE RECORDING MEDIUM FOR SUPPORTING TRANSPORTATION OF GOODS

CROSS-REFERENCE TO RELATED APPLICATION(S)

This application is a national phase of Patent Cooperation Treaty (PCT) International Application No. PCT/KR2022/013683 filed on Sep. 14, 2022, which claims priority to Korean Patent Application No. 10-2021-0126214 filed on Sep. 24, 2021. The entire contents of PCT International Application No. PCT/KR2022/013683 and Korean Patent Application No. 10-2021-0126214 are hereby incorporated by reference.

FIELD OF THE INVENTION

The present invention relates to a method, system, and non-transitory computer-readable recording medium for supporting transportation of goods.

BACKGROUND

In recent years, the explosive growth of the e-commerce market has led to a significant increase in the quantity of delivery items. In general, in order to efficiently transport the increased quantity of delivery items, the delivery industry has arbitrarily assigned a person in charge to each predetermined area, so that the person in charge transports delivery items that need to be transported in the area.

However, the quantity of delivery items varies greatly depending on the area, or depending on the time of the year even in the same area. When the person in charge is arbitrarily assigned to each predetermined area as above, it is difficult to determine the person in charge in consideration of these differences or variations. For example, when the holidays approach, the quantity of delivery items increases dramatically compared to normal times, but the number of people in charge of transporting the increased quantity of delivery items in each area does not change, causing problems such as delivery delays and overwork of the people in charge.

In this connection, the inventor(s) present a technique capable of solving the transporter overwork problem and speeding up the delivery of goods by determining, on the basis of a quantity of goods to be transported and an amount of time required for transportation of the goods which vary with time, at least one optimal regional unit where last-mile delivery of the goods is to be performed, and determining a transporter to transport the goods to be transported in each of the determined at least one regional unit.

SUMMARY OF THE INVENTION

One object of the present invention is to solve all the above-described problems in prior art.

Another object of the invention is to acquire at least one of information on a delivery place or collection place and a quantity of goods to be transported, and information on an amount of time required for transportation of the goods, and determine at least one optimal regional unit where last-mile delivery of the goods is to be performed, on the basis of the acquired information.

Another object of the invention is to further acquire information on a transporter to transport the goods, and determine the at least one optimal regional unit on the further basis of the information on the transporter.

Another object of the invention is to acquire information on a transporter to transport the goods, and determine a transporter to be assigned to the at least one optimal regional unit on the basis of the information on the transporter.

Another object of the invention is to sort the goods to be transported on the basis of the at least one optimal regional unit, and provide information on transportation of the sorted goods to a plurality of transporters so that a transporter to transport the goods is determined.

The representative configurations of the invention to achieve the above objects are described below.

According to one aspect of the invention, there is provided a method comprising the steps of: acquiring at least one of information on a delivery place or collection place and a quantity of goods to be transported, and information on an amount of time required for transportation of the goods; and determining at least one optimal regional unit where last-mile delivery of the goods is to be performed, on the basis of the acquired information.

According to another aspect of the invention, there is provided a system comprising: an information acquisition unit configured to acquire at least one of information on a delivery place or collection place and a quantity of goods to be transported, and information on an amount of time required for transportation of the goods; and a regional unit determination unit configured to determine at least one optimal regional unit where last-mile delivery of the goods is to be performed, on the basis of the acquired information.

In addition, there are further provided other methods and systems to implement the invention, as well as non-transitory computer-readable recording media having stored thereon computer programs for executing the methods.

According to the invention, it is possible to solve the transporter overwork problem and speed up the delivery of goods by determining, on the basis of a quantity of goods to be transported and an amount of time required for transportation of the goods which vary with time, at least one optimal regional unit where last-mile delivery of the goods is to be performed, and determining a transporter to transport the goods to be transported in each of the determined at least one regional unit.

DETAILED DESCRIPTION

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Meanwhile, a regional unit as used herein may refer to a predetermined spatial unit where last-mile delivery of goods is performed. Further, an optimal regional unit according to one embodiment of the invention may refer to a spatial unit that allows a transporter performing the last-mile delivery to transport or collect a reference quantity of goods (e.g., about 40 or all quantity of goods assigned to be delivered in a regional unit covered by the transporter on the same day) to a delivery place or from a collection place within a reference time period (e.g., three hours or working hours in a day). Meanwhile, according to one embodiment of the invention, the regional unit may be determined differently from an administrative area such as a county, district, and neighborhood, and may be predetermined before the goods are sorted. It should also be understood that the regional unit according to one embodiment of the invention may be expanded or contracted according to various circumstances to be described later.

Further, a first transportation point as used herein may refer to a location where goods to be transported to delivery places are gathered and sorted by regional units, i.e., a kind of pickup point or logistics center. According to one embodiment of the invention, the goods may be sorted by regional units only once and placed in delivery boxes at the first transportation point.

Furthermore, a second transportation point as used herein may refer to a location that serves as the origin of the last-mile delivery and is in close proximity to all of a predetermined number of regional that are units geographically close to each other. Of course, according to one embodiment of the invention, the second transportation point may be a location that is included in a part of the predetermined number of regional units. For example, according to one embodiment of the invention, the second transportation point may be an idle warehouse of a gas station that is in close proximity to all three or four regional units that are geographically close to each other. According to one embodiment of the invention, the goods sorted by regional units are transported from the first transportation point to the second transportation point, and the last-mile delivery is initiated by the transporter from the second transportation point.

Configuration of the Entire System

Figure 1:
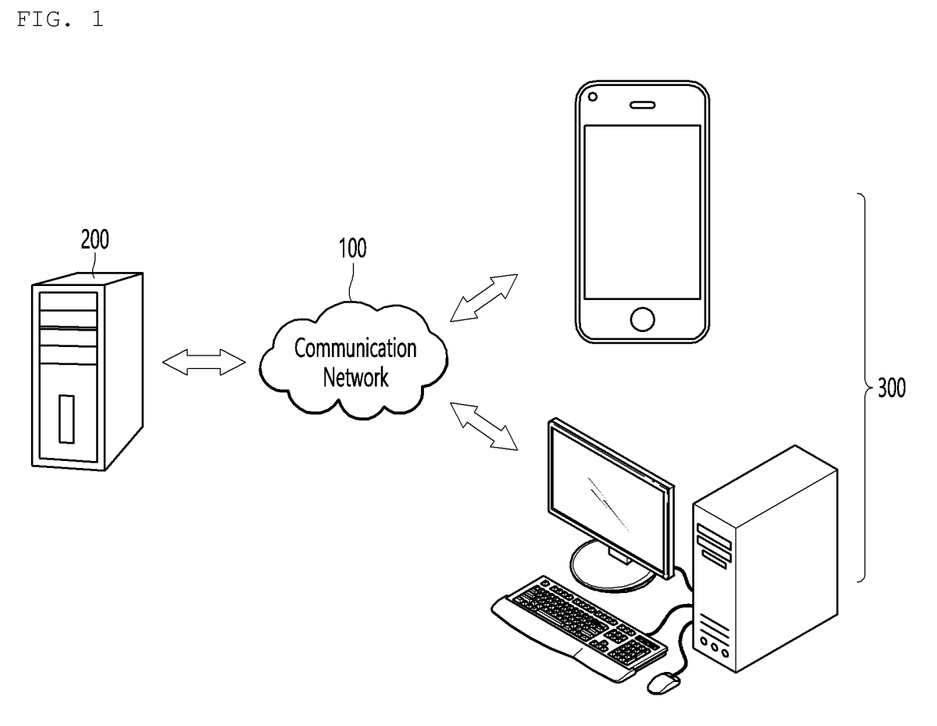
FIG. 1 schematically shows the configuration of an entire system for supporting transportation of goods according to one embodiment of the invention.

FIG. 1 schematically shows the configuration of the entire system for supporting transportation of goods according to one embodiment of the invention.

As shown in FIG. 1, the entire system according to one embodiment of the invention may comprise a communication network 100, a goods transportation support system 200, and a device 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as WiFi communication, WiFi-Direct communication, Long Term Evolution (LTE) communication, 5G communication, Bluetooth communication (including Bluetooth Low Energy (BLE) communication), infrared communication, and ultrasonic communication. As another example, the communication network 100 may be an optical communication network, at least a part of which may be implemented with a conventional communication scheme such as LiFi (Light Fidelity).

Next, the goods transportation support system 200 according to one embodiment of the invention may function to acquire at least one of information on a delivery place or collection place and a quantity of goods to be transported, and information on an of time required for amount transportation of the goods, and determine at least one optimal regional unit where last-mile delivery of the goods is to be performed, on the basis of the acquired information.

The configuration and functions of the goods transportation support system 200 according to the invention will be discussed in more detail below.

Next, the device 300 according to one embodiment of the invention is digital equipment capable of connecting to and then communicating with the goods transportation support system 200, and any type of digital equipment having a memory means and a microprocessor for computing capabilities, such as a smart phone, a tablet, a smart watch, a smart band, smart glasses, a desktop computer, a notebook computer, a workstation, a personal digital assistant (PDAs), a web pad, and a mobile phone, may be adopted as the device 300 according to the invention.

In particular, the device 300 may include an application (not shown) for assisting a user to be provided with the functions according to the invention from the goods transportation support system 200. The application may be downloaded from the goods transportation support system 200 or an external application distribution server (not shown). Meanwhile, the characteristics of the application may be generally similar to those of an information acquisition unit 210, a regional unit determination unit 220, a transportation management unit 230, a communication unit 240, and a control unit 250 of the goods transportation support system 200 to be described below. Here, at least a part of the application may be replaced with a hardware device or a firmware device that may perform a substantially equal or equivalent function, as necessary.

Configuration of the Goods Transportation Support System

Hereinafter, the internal configuration of the goods transportation support system 200 crucial for implementing the invention and the functions of the respective components thereof will be discussed.

Figure 2:
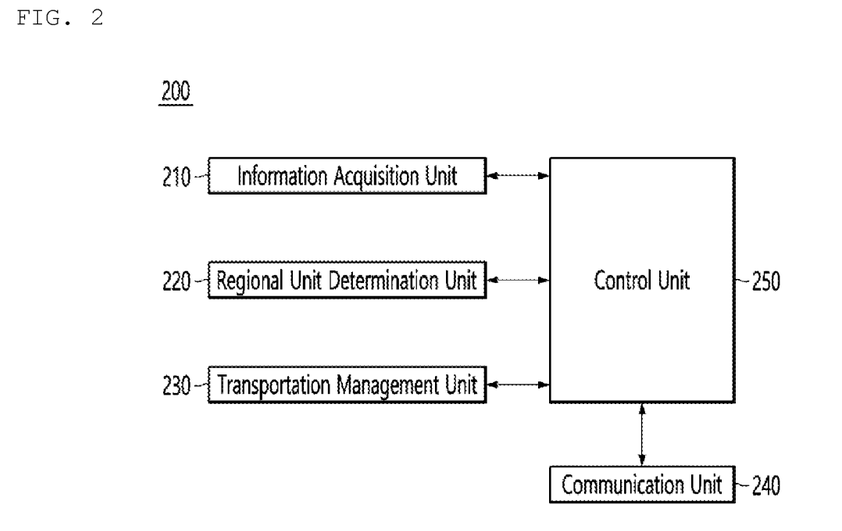
FIG. 2 specifically shows the internal configuration of a goods transportation support system according to one embodiment of the invention.
Figure 3:
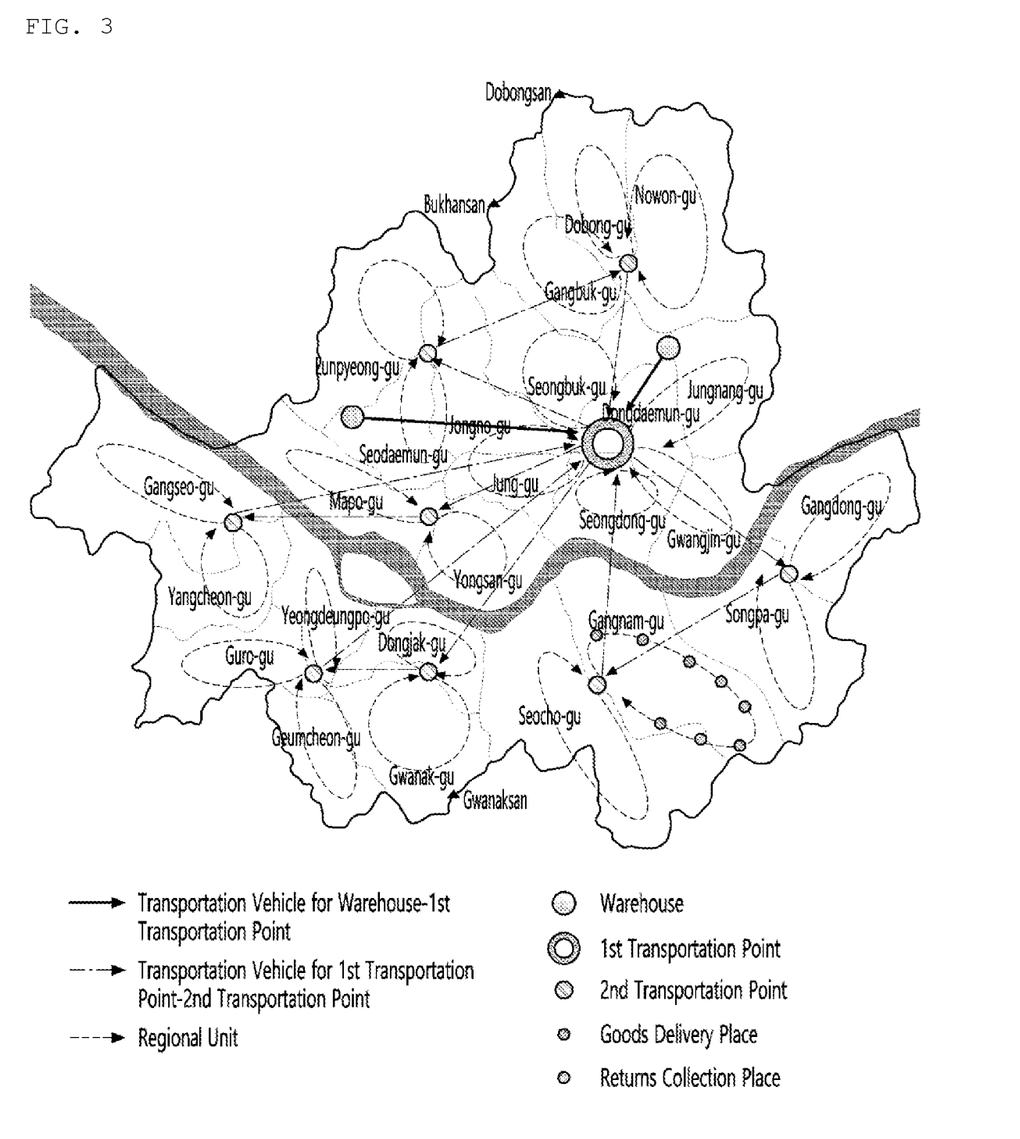
FIG. 3 illustratively shows how goods are transported according to one embodiment of the invention.

FIG. 2 specifically shows the internal configuration of the goods transportation support system 200 according to one embodiment of the invention.

As shown in FIG. 2, the goods transportation support system 200 according to one embodiment of the invention may comprise an information acquisition unit 210, a regional unit determination unit 220, a transportation management unit 230, a communication unit 240, and a control unit 250. According to one embodiment of the invention, at least some of the information acquisition unit 210, the regional unit determination unit 220, the transportation management unit 230, the communication unit 240, and the control unit 250 may be program modules to communicate with an external system (not shown). The program modules may be included in the goods transportation support system 200 in the form of operating systems, application program modules, or other program modules, while they may be physically stored in a variety of commonly known storage devices. Further, the program modules may also be stored in a remote storage device that may communicate with the goods transportation support system 200. Meanwhile, such program modules may include, but are not limited to, routines, programs, objects, subroutines, components, data structures, and the like for performing specific tasks or executing specific abstract data types as will be described below in accordance with the invention.

Meanwhile, the above description is illustrative although the goods transportation support system 200 has been described as above, and it will be apparent to those skilled in the art that at least a part of the components or functions of the goods transportation support system 200 may be implemented in the device 300 or a server (not shown) or included in an external system (not shown), as necessary.

First, the information acquisition unit 210 according to one embodiment of the invention may function to acquire at least one of information on a delivery place or collection place and a quantity of goods to be transported, and information on an amount of time required for transportation of the goods.

Specifically, the information acquisition unit 210 according to one embodiment of the invention may directly or indirectly acquire the information on the delivery place or collection place and the quantity of goods to be transported from an entity that sells the goods such as an e-commerce company or an individual seller, or an entity that wishes to return the goods. Here, the information acquisition unit 210 according to one embodiment of the invention may acquire the information on the quantity of goods to be transported for each of regional units (e.g., previously determined regional units) on the basis of the information on the delivery place or collection place. Alternatively, the information acquisition unit 210 according to one embodiment of the invention may acquire the information on the quantity of goods to be transported for each of predetermined spatial units (e.g., administrative areas) on the basis of the information on the delivery place or collection place, regardless of the regional units.

Further, the information acquisition unit 210 according to one embodiment of the invention may acquire the information on the delivery place or collection place and the quantity of goods to be transported by estimating the delivery place or collection place and the quantity of goods to be transported. More specifically, the information acquisition unit 210 according to one embodiment of the invention may estimate the delivery place or collection place and the quantity of goods to be transported in a statistical manner on the basis of, for example, information on a delivery place or collection place and a quantity of goods transported in the past, and a correlation between such information and quantity influencing factors that may affect the quantity of goods (e.g., time, weather, and date). Further, the information acquisition unit 210 according to one embodiment of the invention may estimate the delivery or collection place and the quantity of goods to be transported using an artificial intelligence model that is trained on the basis of, for example, information on a delivery place or collection place and a quantity of goods transported in the past, and a correlation between such information and the quantity influencing factors.

In addition, the information acquisition unit 210 according to one embodiment of the invention may acquire the information on the amount of time required for transportation of the goods to be transported by estimating the amount of time required for transportation of the goods. Here, the information acquisition unit 210 according to one embodiment of the invention may acquire the information on the amount of time required for transportation of the goods for each of regional units (e.g., previously determined regional units) on the basis of the information on the delivery place or collection place of the goods. Alternatively, the information acquisition unit 210 according to one embodiment of the invention may acquire the information on the amount of time required for transportation of the goods for each of predetermined spatial units (e.g., administrative areas) on the basis of the information on the delivery place or collection place, regardless of the regional units.

Meanwhile, according to one embodiment of the invention, the amount of time required for transportation of the goods may refer to an amount of time required for transportation of a predetermined unit quantity of goods (e.g., a quantity of goods that a transporter performing last-mile delivery can transport in a single trip through a regional unit covered by the transporter), or an amount of time required for transportation of all quantity of goods assigned to be delivered in a given regional unit within a predetermined time period (e.g., the same day when the goods are received at a second transportation point).

More specifically, the information acquisition unit 210 according to one embodiment of the invention may estimate the amount of time required for transportation of the goods in a statistical manner on the basis of, for example, information on an amount of time required for transportation of goods transported in the past, and a correlation between such information and time influencing factors that may affect the amount of time required for transportation of the goods (e.g., a delivery place or collection place and a quantity of goods transported in the past, time, weather, date, and traffic). Further, the information acquisition unit 210 according to one embodiment of the invention may estimate the amount of time required for transportation of the goods using an artificial intelligence model that is trained on the basis of, for example, information on an amount of time required for transportation of goods transported in the past, and a correlation between such information and the time influencing factors. In addition, the information acquisition unit 210 according to one embodiment of the invention may derive an estimated travel route on the basis of the information on the delivery place or collection place of the goods, and estimate the amount of time required for transportation of the goods on the basis of the estimated travel route.

Further, the information acquisition unit 210 according to one embodiment of the invention may function to acquire information on a transporter to transport the goods.

Specifically, according to one embodiment of the invention, the information on the transporter to transport the goods may include identification information of the transporter, a regional unit that the transporter covers or may cover, a transportation means of the transporter (e.g., foot, bicycle, two-wheeler, or automobile), a number of transporters per regional unit, and the like. According to one embodiment of the invention, the information on the transporter to transport the goods may be stored on a server (not shown). Further, the information acquisition unit 210 according to one embodiment of the invention may estimate the amount of time required for transportation of the goods in consideration of the information on the transporter to transport the goods.

However, the types or acquisition manners of the information on the delivery place or collection place and the quantity of the goods, the information on the amount of time required for transportation of the goods, and the information on the transporter to transport the goods according to one embodiment of the invention are not limited to the foregoing, and may be diversely changed as long as the objects of the invention may be achieved.

Next, the regional unit determination unit 220 according to one embodiment of the invention may function to determine at least one optimal regional unit where last-mile delivery of the goods is to be performed, on the basis of the information acquired by the information acquisition unit 210 according to one embodiment of the invention, i.e., at least one of the information on the delivery place or collection place and the quantity of the goods to be transported, and the information on the amount of time required for transportation of the goods. In addition, the regional unit determination unit 220 according to one embodiment of the invention may determine the at least one optimal regional unit on the further basis of the information on the transporter to transport the goods acquired by the information acquisition unit 210 according to one embodiment of the invention.

Specifically, the regional unit determination unit 220 according to one embodiment of the invention may determine the optimal regional unit as a spatial unit that allows a transporter performing the last-mile delivery to transport or collect a reference quantity of goods (e.g., about 40 or all quantity of goods assigned to be delivered on the same day when the goods are received at a second transportation point adjacent to a regional unit covered by the transporter) to the delivery place or from the collection place within a reference time period (e.g., three hours or working hours in a day). Meanwhile, the regional unit determination unit 220 according to one embodiment of the invention may determine the optimal regional unit by contracting or expanding a predetermined regional unit, but may also determine the optimal regional unit by setting a new regional unit regardless E a predetermined regional unit (e.g., a previously determined regional unit).

For example, when the quantity of goods to be transported (which may refer to goods to be transported in a particular regional unit) increases, or when the transporter is expected to be unable to transport or collect the reference quantity of goods within the reference time period due to bad weather (e.g., snow or rain) or high traffic hours (e.g., rush hours), the regional unit determination unit 220 according to one embodiment of the invention may determine the at least one optimal regional unit by setting a regional unit of an appropriate size or narrowing a predetermined regional unit, so that the transporter may transport or collect the reference quantity of goods within the reference time period. Meanwhile, when the optimal regional unit is determined by narrowing a particular regional unit, the regional unit determination unit 220 according to one embodiment of the invention may adjust at least one other regional unit so that the narrowed region is covered, or may create another new regional unit in addition to or in place of the regional unit so that the narrowed region is covered. That is, according to one embodiment of the invention, the number of regional units as well as their sizes may be determined dynamically.

As another example, when the information acquisition unit 210 according to one embodiment of the invention further acquires the information on the transporter to transport the goods, the regional unit determination unit 220 according to one embodiment of the invention may determine the at least one optimal regional unit on the further basis of a regional unit that the transporter covers or may cover, a transportation means of the transporter, a number of transporters per regional unit, changes in the information on the transporter, and the like.

Next, when the information acquisition unit 210 according to one embodiment of the invention acquires the information on the transporter to transport the goods, the transportation management unit 230 according to one embodiment of the invention may function to determine a transporter to be assigned to the at least one optimal regional unit on the basis of the information on the transporter.

For example, the transportation management unit 230 according to one embodiment of the invention may determine the transporter to be assigned to the at least one optimal regional unit, with reference to a regional unit that the transporter covers or may cover, a transportation means of the transporter, a number of transporters per regional unit, and the like, such that more transporters and/or transporters capable of transporting a larger quantity of goods are assigned to a regional unit where a larger quantity of goods are to be transported.

Conversely, the transportation management unit 230 according to one embodiment of the invention may determine the transporter to be assigned to the at least one optimal regional unit that such fewer transporters and/or transporters capable of transporting a smaller quantity of goods are assigned to a regional unit where a smaller quantity of goods are to be transported.

Meanwhile, the transportation management unit 230 according to one embodiment of the invention may function to sort the goods to be transported on the basis of the at least one optimal regional unit determined by the regional unit determination unit 220 according to one embodiment of the invention.

For example, the transportation management unit 230 according to one embodiment of the invention may provide information on the at least one optimal regional unit determined as above to a worker performing a task of sorting goods at a first transportation point, in order to ensure that the goods to be transported are placed in a delivery box for each optimal regional unit.

Further, the transportation management unit 230 according to one embodiment of the invention may function to provide information on transportation of the goods sorted as above to a plurality of transporters so that a transporter to transport the goods is determined.

Specifically, according to one embodiment of the invention, the information on transportation of the sorted goods may include at least one of information on a second transportation point at which the sorted goods or the delivery boxes containing the sorted goods are located or will be located (e.g., identification information or an address of the second transportation point, a remaining distance from a current location of transporter the to the second transportation point, and an amount of time required to travel from the current location of the transporter to the second transportation point), a regional unit where the sorted goods are to be transported, identification information of the sorted goods or the delivery boxes containing the sorted goods, information on a time at which transportation of the sorted goods should begin (e.g., a time of loading or an amount of time remaining until the time of loading), and information on a revenue to be received by the transporter for transporting the sorted goods or the delivery boxes containing the sorted goods (e.g., an amount of money to be received by the transporter and a basis for calculating the amount of money (e.g., the number of goods to be transported or difficulty of transportation)). Further, the transportation management unit 230 according to one embodiment of the invention may provide the information on transportation of the sorted goods to the plurality of transporters, and assist the plurality of transporters in selecting the goods or delivery boxes to transport, respectively, so that the transporter to transport the goods is determined.

For example, the transportation management unit 230 according to one embodiment of the invention may provide the information on transportation of the sorted goods to the plurality of transporters, and determine a transporter who first selects particular goods or delivery boxes among the plurality of transporters as the transporter to transport the particular goods or delivery boxes (i.e., transporter determination in a first-come, first-served manner).

As another example, the transportation management unit 230 according to one embodiment of the invention may provide the information on transportation of the sorted goods to the plurality of transporters, and ensure that each time particular goods or delivery boxes are selected by any one of the plurality of transporters, the amount of money to be received by the transporter for transporting the particular goods or delivery boxes is reduced by a predetermined percentage or predetermined unit and provided back to the plurality of transporters. Further, the transportation management unit 230 according to one embodiment of the invention may determine a transporter who last selects the particular goods or delivery boxes as the transporter to transport the particular goods or delivery boxes (i.e., transporter determination in a competitive bidding manner).

Meanwhile, when providing the information on transportation of the sorted goods to the plurality of transporters, the transportation management unit 230 according to one embodiment of the invention may determine the amount of money to be received by the transporter for transporting the sorted goods or the delivery boxes containing the sorted goods.

Specifically, the transportation management unit 230 according to one embodiment of the invention may determine the amount of money on the basis of at least one of a number of goods to be transported by the transporter (e.g., a number of goods contained in a particular delivery box), difficulty of transportation, and a level of supply and demand for transporters in a regional unit where the sorted goods are to be transported. Here, the transportation management unit 230 according to one embodiment of the invention may derive the difficulty of transportation on the basis of weather, an amount of time required for transportation of the goods, a distance to be traveled, geographical characteristics of the delivery place or collection place, and the like.

For example, the transportation management unit 230 according to one embodiment of the invention may determine that the amount of money to be received by the transporter for transporting the goods is larger as the number of goods to be transported is larger, the difficulty of transportation is higher, and supply of transporters in a regional unit including the delivery place or collection place of the goods to be transported is insufficient relative to demand for transporters in the regional unit. This naturally ensures that more transporters are supplied to regional units that are in short supply of transporters.

Conversely, the transportation management unit 230 according to one embodiment of the invention may determine that the amount of money to be received by the transporter for transporting the goods is smaller as the number of goods to be transported is smaller, the difficulty of transportation is lower, and supply of transporters in a regional unit including the delivery place or collection place of the goods to be transported is sufficient relative to demand for transporters in the regional unit. This naturally ensures that no additional transporters are supplied to region units that are in sufficient supply of transporters.

Next, the communication unit 240 according to one embodiment of the invention may function to enable data transmission/reception from/to the information acquisition unit 210, the regional unit determination unit 220, and the transportation management unit 230.

Lastly, the control unit 250 according to one embodiment of the invention may function to control data flow among the information acquisition unit 210, the regional unit determination unit 220, the transportation management unit 230, and the communication unit 240. That is, the control unit 250 according to one embodiment of the invention may control data flow into/out of the goods transportation support system 200 or data flow among the respective components of the goods transportation support system 200, such that the information acquisition unit 210, the regional unit determination unit 220, the transportation management unit 230, and the communication unit 240 may carry out their particular functions, respectively.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method performed in a system for supporting transportation of goods, the system comprising one or more processors and the method comprising the steps of:
   by the one or more processors, acquiring information on a delivery place or collection place and a quantity of goods to be transported, information on an amount of time required for transportation of the goods, and information on a transporter to transport the goods;
   by the one or more processors, determining at least one optimal regional unit where last-mile delivery of the goods is to be performed, on the basis of the acquired information; and
   by the one or more processors, determining a transporter to be assigned to the at least one optimal regional unit, on the basis of the information on the transporter,
   wherein the at least one optimal regional unit is determined as a spatial unit that allows a transporter performing the last-mile delivery to transport or collect a reference quantity of goods to the delivery place or from the collection place within a reference time period,
   wherein the at least one optimal regional unit is determined by contracting or expanding a predetermined regional unit, or by setting a new regional unit regardless of the predetermined regional unit,
   wherein in the acquiring step, the quantity of goods to be transported is estimated using an artificial intelligence model that is trained on the basis of a correlation between information on a quantity of goods transported in the past and quantity influencing factors capable of affecting the quantity of goods,
   wherein in the acquiring step, the amount of time required for transportation of the goods is estimated using an artificial intelligence model that is trained on the basis of a correlation between information on an amount of time required for transportation of goods transported in the past and time influencing factors capable of affecting the amount of time required for transportation of the goods, and
   wherein an automobile serves as the transporter and the method further comprises the step of:
   in response to determining the transporter to be assigned to the at least one optimal regional unit, automatically causing the automobile to perform the last-mile delivery to transport or collect the reference quantity of goods to the delivery place or from the collection place within the reference time period.

2. The method of claim 1, further comprising the step of:
   by the one or more processors, sorting the goods to be transported on the basis of the determined at least one optimal regional unit.

3. The method of claim 2, wherein information on transportation of the sorted goods is provided to a plurality of transporters so that a transporter to transport the goods is determined.

4. The method of claim 3, wherein the transporter to transport the goods is determined in a first-come, first-served manner or a competitive bidding manner.

5. The method of claim 3, wherein the information on transportation of the sorted goods includes an amount of money to be received by the transporter for transporting the sorted goods or delivery boxes containing the sorted goods, and
   wherein the amount of money is determined on the basis of at least one of a number of goods to be transported by the transporter, difficulty of transportation, and a level of supply and demand for transporters in a regional unit where the sorted goods or the delivery boxes are to be transported.

6. A non-transitory computer-readable recording medium having stored thereon a computer program for executing the method of claim 1.

7. A system for supporting transportation of goods, the system comprising one or more processors configured to:
   acquire information on a delivery place or collection place and a quantity of goods to be transported, information on an amount of time required for transportation of the goods, and information on a transporter to transport the goods;
   determine at least one optimal regional unit where last-mile delivery of the goods is to be performed, on the basis of the acquired information; and
   determine a transporter to be assigned to the at least one optimal regional unit, on the basis of the information on the transporter,
   wherein the at least one optimal regional unit is determined as a spatial unit that allows a transporter performing the last-mile delivery to transport or collect a reference quantity of goods to the delivery place or from the collection place within a reference time period,
   wherein the at least one optimal regional unit is determined by contracting or expanding a predetermined regional unit, or by setting a new regional unit regardless of the predetermined regional unit,
   wherein the one or more processors are configured to estimate the quantity of goods to be transported using an artificial intelligence model that is trained on the basis of a correlation between information on a quantity of goods transported in the past and quantity influencing factors capable of affecting the quantity of goods,
   wherein the one or more processors are configured to estimate the amount of time required for transportation of the goods using an artificial intelligence model that is trained on the basis of a correlation between information on an amount of time required for transportation of goods transported in the past and time influencing factors capable of affecting the amount of time required for transportation of the goods,
   wherein the system further comprises an automobile configured to serve as the transporter, and
   wherein the one or more processors are configured to, in response to determining the transporter to be assigned to the at least one optimal regional unit, automatically cause the automobile to perform the last-mile delivery to transport or collect the reference quantity of goods to the delivery place or from the collection place within the reference time period.

8. The system of claim 7, wherein the one or more processors are configured to sort the goods to be transported on the basis of the determined at least one optimal regional unit.

9. The system of claim 8, wherein the one or more processors are configured to provide information on transportation of the sorted goods to a plurality of transporters so that a transporter to transport the goods is determined.

10. The system of claim 9, wherein the transporter to transport the goods is determined in a first-come, first-served manner or a competitive bidding manner.

11. The system of claim 9, wherein the information on transportation of the sorted goods includes an amount of money to be received by the transporter for transporting the sorted goods or delivery boxes containing the sorted goods, and     wherein the one or more processors are configured to determine the amount of money on the basis of at least one of a number of goods to be transported by the transporter, difficulty of transportation, and a level of supply and demand for transporters in a regional unit where the sorted goods or the delivery boxes are to be transported.

* * * * *